(12) United States Patent
Miyamoto et al.

(10) Patent No.: US 9,399,188 B2
(45) Date of Patent: Jul. 26, 2016

(54) APPARATUS FOR REMOVING CARBON DIOXIDE IN COMBUSTION EXHAUST GAS

(75) Inventors: Eiji Miyamoto, Kure (JP); Koichi Yokoyama, Kure (JP); Shigehito Takamoto, Kure (JP); Naoki Oda, Kure (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 158 days.

(21) Appl. No.: 13/988,898

(22) PCT Filed: Nov. 21, 2011

(86) PCT No.: PCT/JP2011/076789
§ 371 (c)(1),
(2), (4) Date: Jun. 4, 2013

(87) PCT Pub. No.: WO2012/070523
PCT Pub. Date: May 31, 2012

(65) Prior Publication Data
US 2013/0284021 A1    Oct. 31, 2013

(30) Foreign Application Priority Data

Nov. 22, 2010  (JP) ................. 2010-259711

(51) Int. Cl.
*B01D 53/14*   (2006.01)
*B01D 53/62*   (2006.01)

(52) U.S. Cl.
CPC ........ *B01D 53/1425* (2013.01); *B01D 53/1418* (2013.01); *B01D 53/1475* (2013.01); *B01D53/62* (2013.01); *B01D 2252/204* (2013.01); *B01D 2257/504* (2013.01); *B01D 2258/0283* (2013.01); *Y02C 10/04* (2013.01); *Y02C 10/06* (2013.01)

(58) Field of Classification Search
CPC ................. B01D 2252/204; B01D 2257/504; B01D 2258/0283; B01D 53/1418; B01D 53/1425; B01D 53/1475; B01D 53/62; Y02C 10/04; Y02C 10/06
See application file for complete search history.

(56) References Cited

U.S. PATENT DOCUMENTS

2009/0193970 A1*  8/2009  Iijima ............................. 95/186

FOREIGN PATENT DOCUMENTS

| EP | 2 085 133 A1 | 8/2009 |
| JP | 5184866 | 7/1993 |

(Continued)

OTHER PUBLICATIONS

Supplementary European Search Report completed Aug. 26, 2014 for European Application No. EP 11 84 2554.

(Continued)

*Primary Examiner* — Duane Smith
*Assistant Examiner* — Cabrena Holecek
(74) *Attorney, Agent, or Firm* — Fay Sharpe LLP

(57) ABSTRACT

An object of the present invention is to provide a $CO_2$ removal apparatus that prevents release of an amine compound of an absorbing solution from a $CO_2$ absorption device. The $CO_2$ removal apparatus includes a desorption column 13 that heats and regenerates an amine compound aqueous solution discharged from a decarbonator 1 making counterflow contact of a combustion exhaust gas and an amine compound aqueous solution; and reflux means that refluxes an amine compound aqueous solution regenerated in the desorption column 13 to the decarbonator 1 via a cooler 19. A contact section that makes counterflow contact of reflux water of the desorption column 13 and a $CO_2$-removed combustion exhaust gas is formed in two stages, and the cooler 19 on the downstream side of the desorption column is also formed in two stages. Reflux water from the first stage cooler is supplied to the first stage contact section, and reflux water from the second stage cooler is supplied to the second stage contact section. As a result, the reflux water from the cooler 19 on the downstream side of the desorption column 13 can be efficiently used for amine removal of the decarbonator 1, and a concentration of an amine released from the decarbonator can be reduced.

2 Claims, 2 Drawing Sheets

(56) References Cited

FOREIGN PATENT DOCUMENTS

| JP | 6252118 | 9/1994 |
|---|---|---|
| JP | 11137960 | 5/1999 |
| JP | 2007190553 | 8/2007 |

OTHER PUBLICATIONS

International Search Report mailed Feb. 13, 2012 for International application No. PCT/JP2011/076789.

* cited by examiner

--Prior Art--

APPARATUS FOR REMOVING CARBON DIOXIDE IN COMBUSTION EXHAUST GAS

TECHNICAL FIELD

The present invention relates to an apparatus and a method for removing carbon dioxide ($CO_2$) in a combustion exhaust gas, and particularly to an apparatus and a method for removing $CO_2$, in which an amine compound is prevented from being released from a $CO_2$ absorption device using an amine compound aqueous solution as a $CO_2$ absorbing solution.

BACKGROUND ART

Over recent years, the greenhouse effect due to carbon dioxide ($CO_2$) has been pointed out as one of the causes for the global warming phenomena, and there has been an internationally urgent need to take countermeasures there against to protect the global environment. Generation sources of $CO_2$ extend to every activity field of human beings where fossil fuels are burnt, and discharge regulations of $CO_2$ tend to be further enhanced in years to come. With this trend, for power generators such as thermal power stations and the like using a large amount of fossil fuels, $CO_2$ removal methods such as a PSA (pressure swing) method, a membrane separation method, reaction absorption using a basic compound, and the like have been researched.

Of these, as an example of the $CO_2$ removal method using a basic compound, Patent Document 1 proposes a decarbonation method using an amine compound aqueous solution as a $CO_2$ absorbent. In this method, since $CO_2$ and an amine compound exothermally react with each other, an absorbing solution temperature in a $CO_2$ absorption section increases, resulting in an increase in a vapor pressure of the amine compound. In other words, since the temperature increase causes a large amount of the absorbing solution to evaporate, the amount of the amine compound accompanying a decarbonated gas increases. Therefore, an absorption column is provided with a washing section, and in this washing section, a decarbonated gas is brought into vapor-liquid contact with a part of reflux water, as washing water, from a cooler disposed on the downstream side of a desorption column for an amine compound aqueous solution, whereby the amine compound accompanying the decarbonated gas has been recovered into a liquid phase. Further, to enhance amine recovery efficiency, Patent Document 2 proposes a method employing a multi-stage structure for the washing section.

FIG. 2 illustrates one example of such a conventional $CO_2$ removal apparatus. This apparatus includes a decarbonator 1 for removing carbon dioxide ($CO_2$) contained in a combustion exhaust gas in a contact section (a packed section) 2 that makes counterflow contact of the combustion exhaust gas and an amine compound aqueous solution; a desorption column 13 for regenerating an amine compound aqueous solution by heating the amine compound aqueous solution discharged from the decarbonator 1; and means (a reflux water supply line) 21 for supplying reflux water from a cooler 19 disposed on the downstream of the desorption column 13 to the decarbonator 1. Herein, in the figure, the symbols 3, 4, and 5 represent a combustion exhaust gas supply line, a $CO_2$-removed combustion exhaust gas, and an amine compound aqueous solution supply line, respectively. The symbols 6, 9, 14, and 20 each represent a nozzle. The symbols 7, 8, and 10 represent a water circulation pump, a cooler, and a $CO_2$-absorbed amine compound drawing line, respectively. The symbols 11 and 12 represent a gas to be treated and a blower, respectively. The symbols 15, 16, 17, and 18 represent a lower packed section of the desorption column, a pump, a $CO_2$ separator, and discharged $CO_2$, respectively. The symbols 22 and 23 represent a heat exchanger and a reboiler, respectively. And, the symbols 24 and 25 represent a washing section and an upper packed section of the desorption column, respectively.

PRIOR ART LIST

Patent Documents

Patent Document 1: JP H05-184866 A
Patent Document 2: JP 2007-190553 A

SUMMARY OF THE INVENTION

Problems to be Resolved by the Invention

In the above-mentioned conventional technique, an amine compound is contained in reflux water from the cooler 19 disposed on the downstream side of the desorption column 13 for an amine aqueous solution. In the case of no adjustment of its concentration, when the amine compound is absorbed in the washing section 24 of the decarbonator, only a small washing effect may have been exhibited, depending on the relationship with a concentration of an amine compound contained in a decarbonated gas.

Means for Solving the Problems

To solve the above-mentioned problems, the invention claimed by the present application is as below.

(1) an apparatus for removing carbon dioxide in a combustion exhaust gas, the apparatus comprising a decarbonator for removing carbon dioxide ($CO_2$) from the combustion exhaust gas in a contact section that makes counterflow contact of the combustion exhaust gas and an amine compound aqueous solution; a desorption column for desorbing $CO_2$ from the amine compound aqueous solution by heating the amine compound aqueous solution discharged from the decarbonator; a first cooler disposed on the downstream side of the desorption column to obtain a first reflux water; a second cooler disposed on the downstream side of the first cooler to obtain a second reflux water; a first washing section disposed on the downstream side of the decarbonator to make counterflow contact of the first reflux water and a $CO_2$-removed combustion exhaust gas from the contact section; and a second washing section disposed on the downstream side of the first washing section to make counterflow contact of the second reflux water and a $CO_2$-removed combustion exhaust gas from the first washing section.

(2) a method for removing carbon dioxide in a combustion exhaust gas using the apparatus according to (1), in which the amount of the first and second reflux waters from the first and second coolers to the decarbonator is adjusted so that a temperature of a combustion exhaust gas is substantially the same in an inlet and an outlet of the decarbonator.

Advantageous Effects of the Invention

According to the present invention, reflux water from a cooler of the upper section of an amine desorption column can be efficiently used for amine removal in the upper section of an absorption column, and a concentration of an amine released from a $CO_2$ removal column can be reduced.

In the present invention, examples of an amine compound used for a $CO_2$ absorbing solution include alcoholic hydroxyl group-containing primary amines such as monoethanolamine, 2-amino-2-methyl-1-propanol and the like; alcoholic hydroxyl group-containing secondary amines such as diethanolamine, 2-methylaminoethanol and the like; alcoholic hydroxyl group-containing tertiary amines such as triethanolamine, N-methyldiethanolamine and the like; polyethylene-polyamines such as ethylenediamine, triethylenediamine, diethylenetriamine, and the like; cyclic amines such as piperazines, piperidines, pyrrolidines and the like; polyamines such as xylylenediamines and the like; amino acids such as methylamino carboxylic acid and the like; and mixtures thereof. Further, a carbon dioxide absorption accelerator, a corrosion inhibitor, and another medium such as methanol, polyethylene glycol, sulfolane, and the like can be added to the absorbing solution.

In addition, it is possible that a demister is disposed in outlets of a $CO_2$ removal column 1 and a washing section 24 to prevent a loss of water and an amine compound due to release of a part of absorbing solution mist supplied to the $CO_2$ removal column 1 or a part of washing water mist supplied to the washing section 24 to the column outside together with a $CO_2$-removed exhaust gas. Further, the washing section 24 may be a packed column or a tray column.

In addition, when a concentration of an amine contained in washing water of the second stage washing section has exceeded a certain value, a part of the washing water may be supplied to the first stage washing section. Further, when a concentration of an amine contained in washing water of the first stage washing section has exceeded another certain value, a part of the washing water may be supplied to an amine compound aqueous solution supplied from the desorption column.

In addition, a carbon dioxide-containing gas to be subjected to decarbonation treatment may be under increasing pressure or under ordinary pressure and its temperature may be low or high. The pressure and temperature thereof are not specifically limited. A combustion exhaust gas under ordinary pressure is preferable.

EMBODIMENTS FOR CARRYING OUT THE INVENTION

Figure 1:
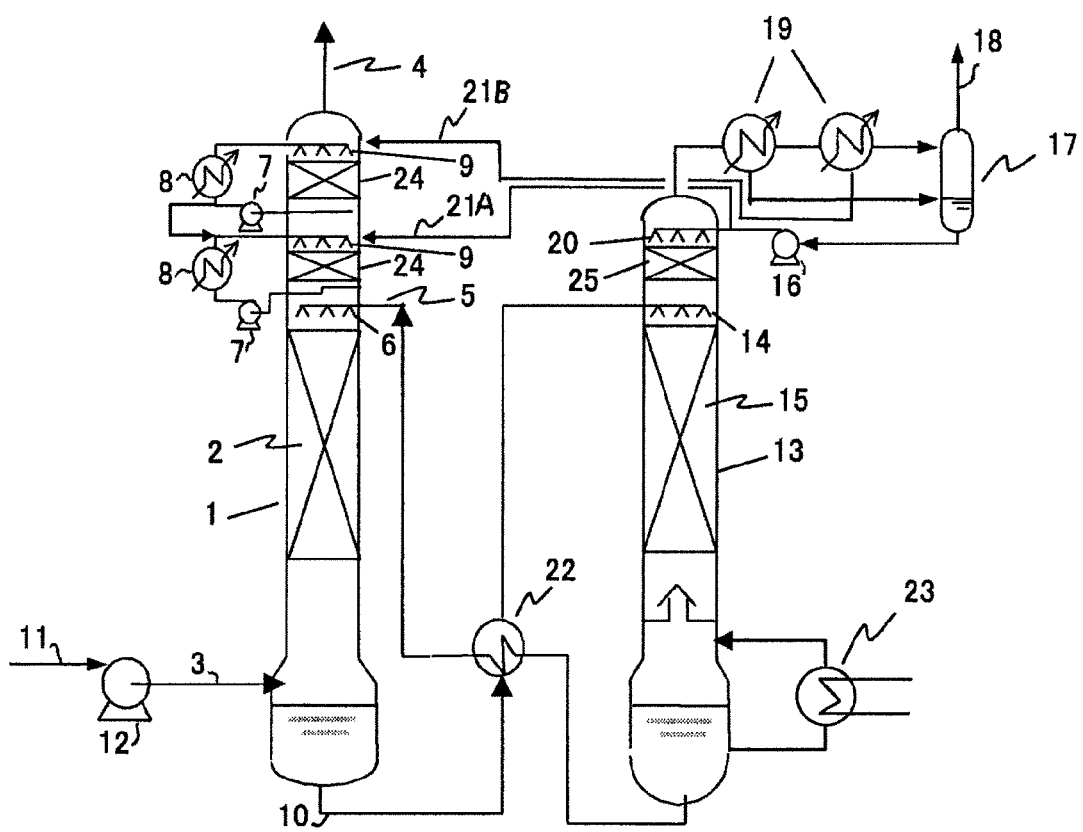
FIG. 1 is a view illustrating a $CO_2$ removal apparatus representing one example of the present invention.
Figure 2:
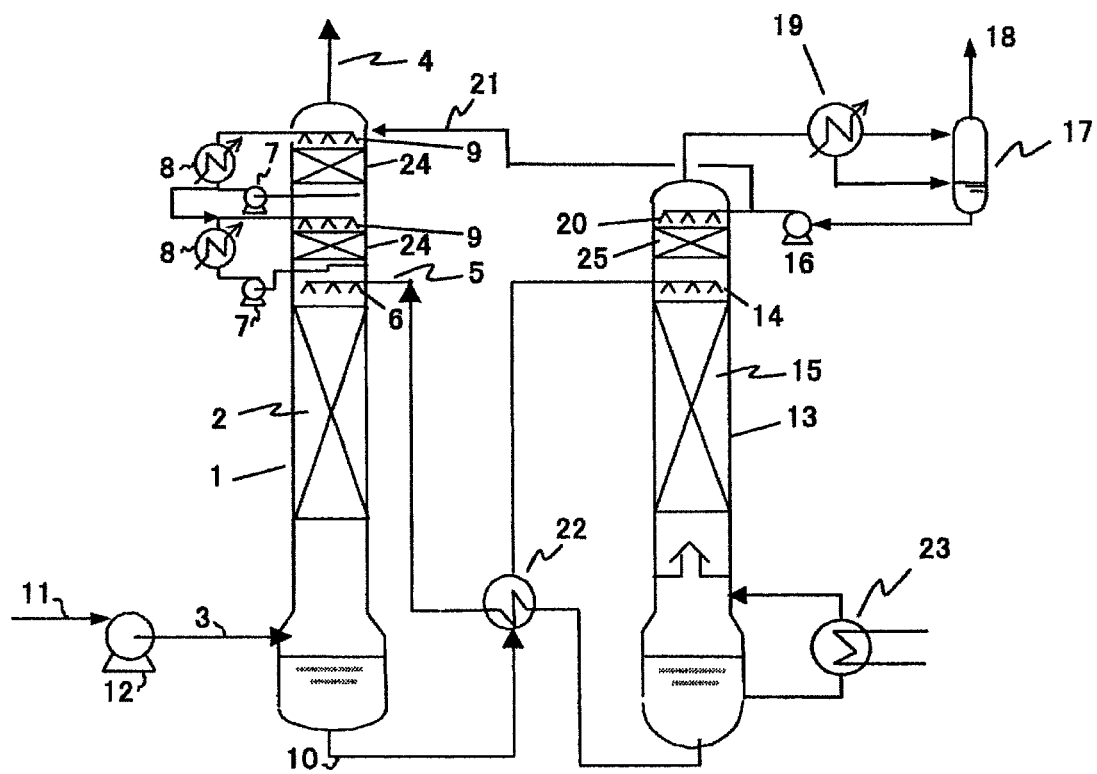
FIG. 2 is a view illustrating a conventional $CO_2$ removal apparatus.

FIG. 1 is a view illustrating a carbon dioxide removal apparatus representing one example of the present invention. A point differing from the conventional apparatus illustrated in FIG. 2 is that the cooler 19 on the downstream side of the desorption column 13 was formed in two stages; and reflux water from a first stage cooler was supplied to a first stage of the washing section 24 of the decarbonator 1 via a pump 16 and a line 21A and reflux water from a second stage cooler was supplied to a second stage of the washing section 24 of the decarbonator 1 via a line 21B. In other words, when a washing section on the downstream side of a $CO_2$ removal column is separated into a plurality of stages, an amine concentration in a $CO_2$-removed combustion exhaust gas is decreased in a stage that is further downstream. A temperature of a combustion exhaust gas containing $CO_2$-removed amine compound vapor is about 100° C. in the outlet of the desorption column 13, and an amine compound having a saturated vapor pressure at this temperature is contained. Gas temperatures in the inlets of the cooler 19 in the first and second stages are about 100° C. and about 70° C., respectively. A concentration of an amine compound contained in condensed water from the cooler in the first stage is five times larger than that in the second stage. A recovery efficiency of an amine compound in the washing section of the decarbonator increases as an anime concentration in a $CO_2$-removed combustion exhaust gas increases or an amine concentration in water decreases. On the other hand, when the amine concentration in a $CO_2$-removed combustion exhaust gas is small and the amine concentration in water is large, an amine moves from the water to the gas, resulting in a possibility of an opposite effect. The present invention is intended to supply water having a larger amine concentration from the first stage cooler to the upstream side of the washing section having a larger amine concentration in a $CO_2$-removed combustion exhaust gas; and to supply water having a smaller amine concentration from the second stage cooler to the downstream side of the washing section having a smaller amine concentration in the $CO_2$-removed combustion exhaust gas to enhance an amine removal efficiency in the washing section of the decarbonator.

In the apparatus of FIG. 1, a combustion exhaust gas 11 is supplied to a $CO_2$ removal column 1 using a blower 12 and brought into counterflow contact with an amine compound aqueous solution having a certain concentration supplied from a nozzle 6 in a contact section (packed section) 2. Then, $CO_2$ in the combustion exhaust gas is absorbed and removed by the amine compound aqueous solution, and then a $CO_2$-removed combustion exhaust gas is sent toward the washing section 24. The amine compound aqueous solution supplied to the $CO_2$ removal column 1 absorbs $CO_2$ and then a temperature of the solution becomes higher than that in a supply inlet 3 due to reaction heat associated with the absorption. And the solution is sent to a heat exchanger 22, followed by heating to be introduced to a desorption column 13. In the present invention, it is desirable to adjust a temperature of an amine compound aqueous solution supplied to the $CO_2$ removal column 1 to export a substantially entire amount of the reaction heat due to $CO_2$ absorption to the outside of the $CO_2$ removal column 1 by an amine compound aqueous solution supplied to the desorption column 13. It is possible to adjust a temperature of the amine compound aqueous solution supplied to the $CO_2$ removal column 1 using a cooler 19 or heat exchanger 22 disposed between the cooler 19 and a supply inlet 6 of the amine compound aqueous solution if appropriate. After a stable state of the system, generally, the temperature of the amine compound aqueous solution in the $CO_2$ removal column 1 is also constant. As a result, a temperature of the combustion exhaust gas does not substantially increase even with the reaction heat, and then the gas moves up in the $CO_2$ removal column 1 at substantially the same temperature as a supply temperature of the combustion exhaust gas supply inlet 3. Herein, "the same" has no strict meaning and falls within substantially the same range while a water balance of the $CO_2$ removal column 1, to be described later, is maintained even upon occurrence of a slight temperature change.

When a temperature of an amine compound aqueous solution supplied from the supply inlet 6 of an amine compound aqueous solution is adjusted so that a temperature of a combustion exhaust gas is the same in the inlet and the outlet of the $CO_2$ removal column 1, a water balance of the $CO_2$ removal column 1 and further a water balance of the entire system of FIG. 1 is maintained. In addition, even when a temperature of a combustion exhaust gas discharged from the $CO_2$ removal column 1 is high, the apparatus and method of the present invention using reflux water from the desorption column 13 for the $CO_2$ removal column 1 as described later make it possible to efficiently prevent an amine compound from diffusing to the outside of the system.

In the desorption column 13, an amine compound aqueous solution is regenerated by heating using a reboiler 23 and drawn from the column bottom, followed by cooling by the heat exchanger 22 to return to the $CO_2$ removal column 1. In the upper section of the desorption column 13, $CO_2$ having been separated from the amine compound aqueous solution makes contact with reflux water supplied from the nozzle 20 and leaves the column top, followed by cooling by the desorption column reflux cooler 19 and by separation from reflux water where water vapor accompanying $CO_2$ has been condensed in a $CO_2$ separator 17 to be introduced to a $CO_2$ recovery process from a line 18. A part of the reflux water is returned to the desorption column 13 using a reflux water pump 16.

Another part of the reflux water is supplied to the $CO_2$ removal column 1 via the nozzle 9 by the desorption column reflux water supply line 21A as described above. In the present invention, the cooler 19 on the downstream side of the desorption column 13 is formed in two stages; and reflux water from the first stage cooler is supplied to the first stage of the washing section 24 of the decarbonator 1 via the pump 16 and the line 21A, and reflux water from the second cooler is supplied to the second stage of the washing section 24 of the decarbonator 1 via the line 21B. Then, a combustion exhaust gas containing $CO_2$-removed amine compound vapor is brought into counterflow contact with the reflux water in the packed section or a section having a tray 24, and thereby it is possible to reduce the amine compound vapor in the combustion exhaust gas to substantially zero. Also, water having a larger amine concentration from the first stage cooler is supplied to the upstream side of the washing section having a larger amine concentration in a $CO_2$-removed combustion exhaust gas and water having a smaller amine concentration from the second stage cooler is supplied to the downstream side of the washing section having a smaller amine concentration in the $CO_2$-removed combustion exhaust gas as described above, and thereby it is possible to remarkably enhance an amine removal efficiency in the washing section of the decarbonator.

EXAMPLES

Examples of the present invention will be more specifically described below, but the present invention is not limited to these examples.

Example 1

Using the apparatus of FIG. 1, a combustion exhaust gas containing 10% of $CO_2$ was supplied at 30 $Nm^3/h$ to the contact section of the decarbonator 1 and brought into counterflow contact with an aqueous solution of an alcoholic hydroxyl group-containing secondary amine serving as an absorbing solution to absorb carbon dioxide. From the contact section outlet, the remaining decarbonated exhaust gas was brought into counterflow contact with washing water in the first stage washing section at a liquid/gas ratio of 2 $L/Nm^3$. Further, the $CO_2$-removed exhaust gas was brought into counterflow contact with washing water at a liquid/gas ratio of 2 $L/Nm^3$ in the second stage washing section and passed through a demister of the second stage washing section outlet to be released to the outside of the system. In this case, the cooler 19 on the downstream side of the desorption column 13 was formed in two stages, and the temperatures of the first and second stage cooler inlets were 100° C. and 70° C., respectively. Condensed water from the first stage cooler was supplied to the first stage washing section at 0.5 L/h, and condensed water from the second stage cooler was supplied to the second stage washing section at 0.6 L/h. At that time, operations were performed so that both a gas temperature of the first stage washing section outlet and a gas temperature of the second stage washing section outlet were 42° C. As a result, an amine compound concentration in a $CO_2$-removed exhaust gas having been released from the absorption column to the outside of the system was 8 ppm.

Comparative Example 1

The same operations were performed as in Example 1 except that in Example 1, the cooler on the downstream side of the desorption column was formed in a single stage and condensed water was supplied to the second stage washing section at 1.1 L/h. As a result, an amine concentration in a $CO_2$-removed gas having been released from the absorption column to the outside of the system was 12 ppm.

EXPLANATION OF SYMBOLS

1: $CO_2$ removal column;
2: contact section (packed section);
3: combustion exhaust gas supply inlet (line);
4: $CO_2$-removed combustion exhaust gas;
5: amine compound aqueous solution supply inlet;
6: nozzle;
7: water circulation pump;
8: cooler;
9: nozzle;
10: $CO_2$-absorbed amine compound drawing line;
11: gas to be treated;
12: blower;
13: desorption column;
14: nozzle;
15: lower packed section;
16: pump;
17: $CO_2$ separator;
18: discharged $CO_2$ line;
19: cooler;
20: nozzle;
21: reflux water supply line;
22: heat exchanger;
23: reboiler;
24: washing section;
25: upper packed section.

The invention claimed is:
1. An apparatus for removing carbon dioxide in a combustion exhaust gas, the apparatus comprising:
a decarbonator comprising a contact section for making counterflow contact of the combustion exhaust gas and an amine compound aqueous solution to remove carbon dioxide from the combustion exhaust gas, a first washing section located downstream of the $CO_2$-removed combustion exhaust gas from the contact section, and a second washing section located downstream of the washed combustion exhaust gas from the first washing section;

a desorption column for desorbing CO2 from the amine compound aqueous solution by heating the amine compound aqueous solution discharged from the decarbonator; and a first cooler located downstream of the desorbed $CO_2$ discharged from the desorption column to obtain a first reflux water containing a first concentration of the amine compound; and a second cooler located downstream of the desorbed $CO_2$ discharged from the first cooler to obtain a second reflux water containing a second concentration of the amine compound;

the first washing section for making counterflow contact of the first reflux water and the CO2-removed combustion exhaust gas from the contact section;

the second washing section for making counterflow contact of the second reflux water and the CO2-removed combustion exhaust gas from the first washing section;

a first pipe arranged from the first cooler to the first washing section to send the first reflux water from the first cooler to the first washing section;

a second pipe arranged from the second cooler to the second washing section to send the second reflux water from the second cooler to the second washing section; and a third pipe arranged from the second washing section to the first washing section to send a solution in the second washing section from the second washing section to the first washing section;

wherein the first concentration is higher than the second concentration.

2. A method for removing carbon dioxide from a combustion exhaust gas using the apparatus according to claim 1, comprising:

making counterflow contact of the combustion exhaust gas and an amine compound aqueous solution in the contact section to remove carbon dioxide from the combustion exhaust gas;

washing the $CO_2$-removed combustion exhaust gas from the contact section with the first reflux water containing a first concentration of the amine compound in the first washing section;

washing the washed combustion exhaust gas from the first washing section with the second reflux water containing a second concentration of the amine compound in the second washing section;

desorbing $CO_2$ from the amine compound aqueous solution in the desorption column by heating the amine compound aqueous solution discharged from the decarbonator;

cooling the desorbed $CO_2$ discharged from the desorption column in the first cooler to obtain the first reflux water;

cooling the desorbed CO2 discharged from the first cooler in the second cooler to obtain the second reflux water;

sending the first reflux water from the first cooler to the first washing section;

sending the second reflux water from the second cooler to the second washing section; and sending a solution in the second washing section from the second washing section to the first washing section, wherein the amount of the first reflux water and the second reflux water supplied from the first cooler and the second cooler to the first washing section and the second washing section is adjusted so that a temperature of the combustion exhaust gas in an inlet of the decarbonator is substantially the same as a temperature of the $CO_2$-removed combustion exhaust gas in an outlet of the decarbonator; and wherein the first concentration is higher than the second concentration.

* * * * *